(12) United States Patent
Kindo et al.

(10) Patent No.: US 9,352,779 B2
(45) Date of Patent: May 31, 2016

(54) VEHICLE TRAVELING CONTROLLER

(75) Inventors: Toshiki Kindo, Yokohama (JP); Kazuaki Aso, Susono (JP); Masahiro Harada, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 505 days.

(21) Appl. No.: 12/738,644

(22) PCT Filed: Oct. 14, 2008

(86) PCT No.: PCT/JP2008/068585
§ 371 (c)(1),
(2), (4) Date: Apr. 19, 2010

(87) PCT Pub. No.: WO2009/051106
PCT Pub. Date: Apr. 23, 2009

(65) Prior Publication Data
US 2010/0217476 A1 Aug. 26, 2010

(30) Foreign Application Priority Data
Oct. 19, 2007 (JP) .................. 2007-272853

(51) Int. Cl.
*B60R 21/00* (2006.01)
*B62D 15/02* (2006.01)
(Continued)

(52) U.S. Cl.
CPC ............ *B62D 15/0265* (2013.01); *G08G 1/165* (2013.01); *G08G 1/166* (2013.01);
(Continued)

(58) Field of Classification Search
CPC .......... B60T 2201/08; B60T 2201/083; B60T 2201/087; B60T 2201/022; B60T 2201/089; B60T 2201/024; B60T 2201/085; B60T 8/17558; B62D 15/0265; B62D 15/029; B60W 30/09; B60W 30/08; B60W 30/0956; B60W 50/14; B60W 30/18172; B60W 50/08; B60W 2040/0818; B60W 2540/00; B60W 2550/20; G08G 1/16; G08G 1/165; G08G 1/166; G08G 1/167; B60R 21/013; B60R 21/0134

USPC ......... 701/1, 23–27, 41, 44, 48, 77, 117–119, 701/300–302; 340/435, 436, 903
See application file for complete search history.

(56) References Cited

U.S. PATENT DOCUMENTS 6,026,347 A * 2/2000 Schuster ...................... 701/301
6,553,130 B1 * 4/2003 Lemelson et al. ............ 382/104
(Continued)

FOREIGN PATENT DOCUMENTS

JP 2003-15742 1/2003
JP 2006 500664 1/2006
(Continued)

OTHER PUBLICATIONS

Office Action issued Jan. 10, 2012 in Japanese Patent Application No. 2007-272853.

*Primary Examiner* — Jason Holloway
(74) *Attorney, Agent, or Firm* — Oblon, McClelland, Maier & Neustadt, L.L.P.

(57) ABSTRACT

A vehicle traveling controller performs emergency evacuation traveling in the case of an emergency. The vehicle traveling controller determines whether a vehicle traveling in accordance with a normal traveling rule is not dangerous and becomes proper traveling or not based on environmental information around the vehicle, when it is determined that the vehicle traveling in accordance with the normal traveling rule becomes proper traveling, executes normal traveling control for instructing the vehicle to travel in accordance with the normal traveling rule, and when the vehicle traveling in accordance with the normal traveling rule does not become proper traveling, executes emergency evacuation traveling control for instructing the vehicle to perform emergency evacuation traveling not in accordance with the normal traveling rule. Therefore, emergency evacuation traveling with high safety can be performed, compared with vehicle traveling in accordance with the normal traveling rule, so safety of vehicle traveling can be improved.

13 Claims, 7 Drawing Sheets

(51) Int. Cl.
  *G08G 1/16* (2006.01)
  *B60W 30/18* (2012.01)
  *B60W 50/08* (2012.01)
  *B60W 40/08* (2012.01)

(52) U.S. Cl.
  CPC ......... *G08G 1/167* (2013.01); *B60W 30/18172* (2013.01); *B60W 50/08* (2013.01); *B60W 2040/0818* (2013.01); *B60W 2540/00* (2013.01); *B60W 2550/20* (2013.01)

(56) References Cited

U.S. PATENT DOCUMENTS

| | | | |
|---|---|---|---|
| 7,016,783 B2 * | 3/2006 | Hac et al. | 701/301 |
| 2003/0060936 A1 * | 3/2003 | Yamamura et al. | 701/1 |
| 2004/0060756 A1 * | 4/2004 | Sekiguchi | 180/168 |
| 2004/0090117 A1 * | 5/2004 | Dudeck et al. | 303/191 |
| 2004/0193374 A1 * | 9/2004 | Hac et al. | 701/301 |
| 2005/0021223 A1 * | 1/2005 | Heaps et al. | 701/200 |
| 2007/0192006 A1 * | 8/2007 | Kimura et al. | 701/45 |
| 2008/0162027 A1 * | 7/2008 | Murphy et al. | 701/117 |

FOREIGN PATENT DOCUMENTS

| | | |
|---|---|---|
| JP | 2006 119090 | 5/2006 |
| JP | 2006 131055 | 5/2006 |
| JP | 2006 523903 | 10/2006 |

\* cited by examiner

*Fig.2*

| PRIORITY | TRAFFIC RULE | DETERMINATION FLAG |
|---|---|---|
| 1 | OBSERVE SIGNAL | ON |
| 2 | SLOW AT PLACE WITH BLOCKED VIEW | ON |
| 2 | OBSERVE STOP | ON |
| 3 | OBSERVE DO NOT ENTER | ON |
| 4 | STOP WITH SPACE ON ROADSIDE | ON |
| 4 | OBSERVE NO STRAY | ON |
| 5 | OBSERVE MINIMUM SPEED | OFF |
| 6 | OBSERVE SPEED LIMIT | OFF |

VEHICLE TRAVELING CONTROLLER

TECHNICAL FIELD

The present invention relates to a vehicle traveling controller that performs traveling control of a vehicle.

BACKGROUND ART

As described in Japanese Unexamined Patent Application Publication No. 2006-131055, a vehicle traveling controller is known that sets absolute rules and relative rules which should be observed when a vehicle is traveling and performs traveling control of the vehicle in accordance with the traveling rules.
[Patent Citation 1] Japanese Unexamined Patent Application Publication No. 2006-131055

DISCLOSURE OF INVENTION

Technical Problem

However, in such a vehicle traveling controller, proper traveling may not be performed in the case of an emergency. In the case of an emergency, for example, when a vehicle coming from the opposite direction strays onto the traveling lane of the own vehicle, or when an obstacle is present on the traveling lane, if the vehicle continues to travel in accordance with traveling rules set in advance, the safety of traveling may be deteriorated and proper traveling may not be performed.

Accordingly, the following is discussed in order to solve such problems, and it is an object of the invention to provide a vehicle traveling controller capable of performing emergency evacuation traveling for proper traveling control in the case of an emergency.

Technical Solution

A vehicle traveling controller according to the invention includes a normal traveling control unit which instructs a vehicle to travel in accordance with a normal traveling rule, a traveling propriety determination unit which determines whether the vehicle traveling in accordance with the normal traveling rule is proper traveling or not on the basis of environmental information around the vehicle, and an emergency evacuation traveling control unit which, when the traveling propriety determination unit determines that the vehicle traveling in accordance with the normal traveling rule is not proper traveling, instructs the vehicle to perform emergency evacuation traveling, which is not in accordance with the normal traveling rule.

With this configuration, when vehicle traveling in accordance with a normal traveling rule is not proper traveling, the vehicle is instructed to perform emergency evacuation traveling which is not in accordance with the normal traveling rule. Therefore, emergency evacuation traveling with high safety can be performed, as compared with vehicle traveling in accordance with the normal traveling rule. As a result, the safety of vehicle traveling can be improved.

In the vehicle traveling controller according to the invention, the traveling propriety determination unit may determine whether the vehicle traveling in accordance with the normal traveling rule exceeds the degree of danger set in advance or not on the basis of the environmental information, and when the traveling propriety determination unit determines that the vehicle traveling in accordance with the normal traveling rule exceeds the degree of danger set in advance, the emergency evacuation traveling control unit may instruct the vehicle to perform emergency evacuation traveling which is not in accordance with the normal traveling rule.

In the vehicle traveling controller according to the invention, the normal traveling control unit may instruct the vehicle to travel in accordance with a plurality of normal traveling rules, the traveling propriety determination unit may determine whether the vehicle traveling in accordance with all of the plurality of normal traveling rules is proper traveling or not on the basis of the environmental information around the vehicle, and when the traveling propriety determination unit determines that the vehicle traveling in accordance with all of the plurality of normal traveling rules is not proper traveling, the emergency evacuation traveling control unit may instruct the vehicle to perform emergency evacuation traveling, which is not in accordance with the normal traveling rules, on the basis of priority set for the plurality of normal traveling rules.

In the vehicle traveling controller according to the invention, the normal traveling control unit may instruct the vehicle to travel in accordance with a plurality of normal traveling rules, the traveling propriety determination unit may determine whether the vehicle traveling in accordance with all of the plurality of normal traveling rules is proper traveling or not on the basis of the environmental information around the vehicle, and when the traveling propriety determination unit determines that the vehicle traveling in accordance with all of the plurality of normal traveling rules is not proper traveling, the emergency evacuation traveling control unit may instruct the vehicle to perform emergency evacuation traveling which is not in accordance with traveling rules having low priority from among the plurality of normal traveling rules.

In this case, when it is determined that the vehicle traveling in accordance with all of the plurality of normal traveling rules is not proper traveling, the vehicle is instructed to perform emergency evacuation traveling which is not in accordance with traveling rules with low priority from among the plurality of normal traveling rules. Therefore, the vehicle can perform safe vehicle traveling while observing a traveling rule with high priority.

Advantageous Effects

According to the invention, emergency evacuation traveling is performed in the case of an emergency, so traveling control with high safety can be performed.

BRIEF DESCRIPTION OF DRAWINGS

FIG. 2 is an explanatory view of a traffic rule table in the vehicle traveling controller of FIG. 1.

EXPLANATION OF REFERENCE

Figure 1:
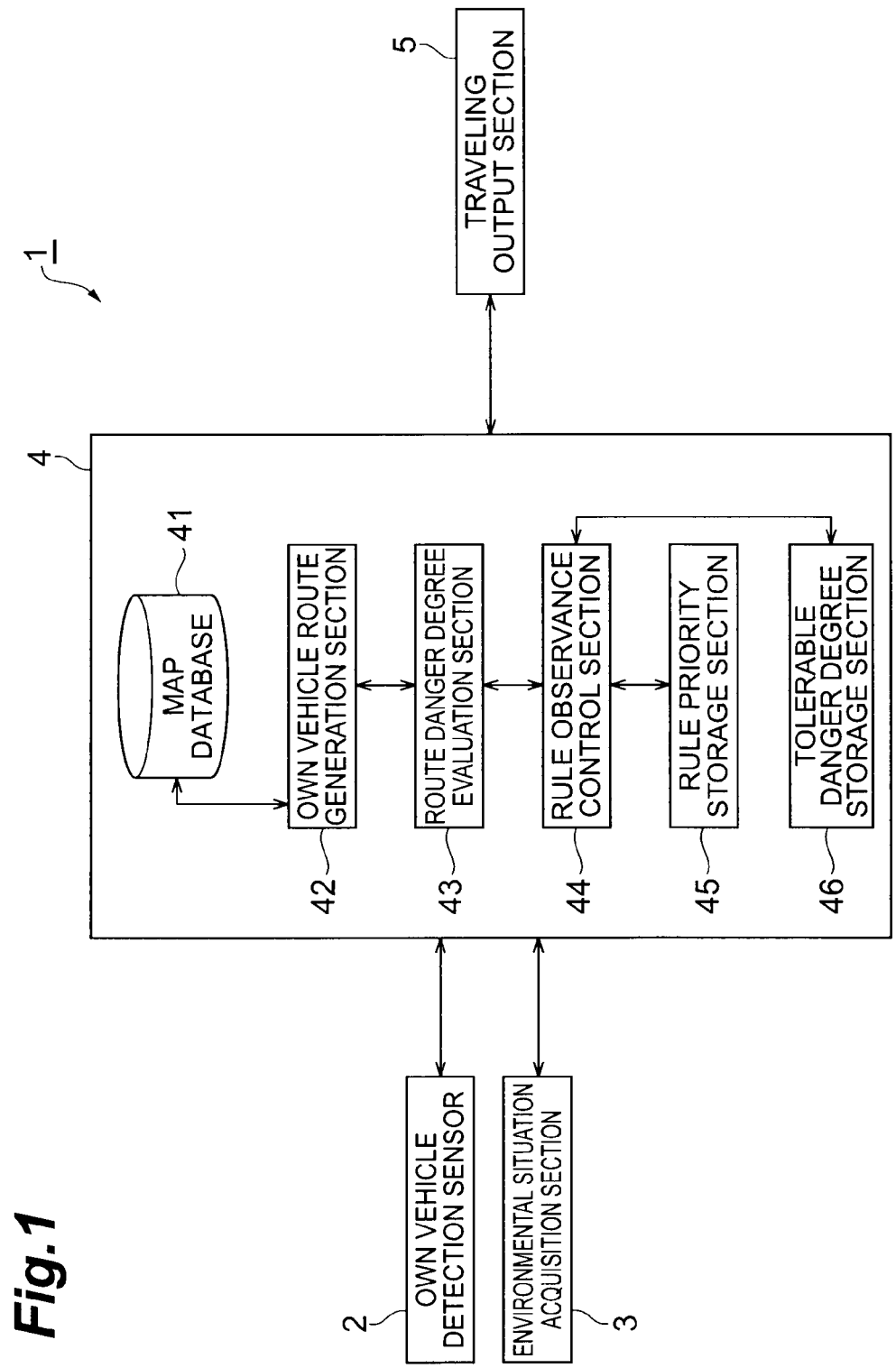
FIG. 1 is a diagram schematically showing a vehicle traveling controller according to an embodiment of the invention.

1: VEHICLE TRAVELING CONTROLLER
2: OWN VEHICLE DETECTION SENSOR
3: ENVIRONMENTAL SITUATION ACQUISITION SECTION
4: ECU
5: TRAVELING OUTPUT SECTION
41: MAP DATABASE
42: OWN VEHICLE ROUTE GENERATION SECTION
43: ROUTE DANGER DEGREE EVALUATION SECTION
44: RULE OBSERVANCE CONTROL SECTION
45: RULE PRIORITY STORAGE SECTION
46: TOLERABLE DANGER DEGREE STORAGE SECTION

BEST MODE FOR CARRYING OUT THE INVENTION

Hereinafter, an embodiment of the invention will be described in detail with reference to the accompanying drawings. In the drawings, the same parts are represented by the same reference numerals, and overlap description will be omitted.

FIG. 1 is a diagram schematically showing the configuration of a vehicle traveling controller according to an embodiment of the invention.

As shown in FIG. 1, a vehicle traveling controller 1 of this embodiment is installed in a vehicle to perform traveling control of the vehicle and is used for automatic driving of the vehicle, for example. The vehicle traveling controller 1 includes an own vehicle detection sensor 2 and an environmental situation acquisition section 3.

The own vehicle detection sensor 2 is a detection sensor for acquiring position information, vehicle speed information, and the like of the own vehicle. As the own vehicle detection sensor 2, for example, a GPS (Global Positioning System) or a wheel speed sensor is used. The position information of the own vehicle can be acquired by the GPS (Global Positioning System), and the vehicle speed information can be acquired by the wheel speed sensor. The environmental situation acquisition section 3 functions as environmental situation acquisition means for acquiring environmental information around the own vehicle. As the environmental situation acquisition section 3, for example, an inter-vehicle communication device, a road-vehicle communication device, a radar sensor using millimeter waves or laser, and the like are used. When the inter-vehicle communication device and the road-vehicle communication are used, position information and vehicle speed information of other vehicles can be acquired. When a millimeter-wave radar sensor or the like is used, position information and relative speed information of other vehicles and obstacles on the road can be acquired.

The vehicle traveling controller 1 includes an ECU (Electronic Control Unit) 4. The ECU 4 performs overall control for the vehicle traveling controller 1, and is composed of, for example, a computer including a CPU, a ROM, and a RAM. The ECU 4 is connected to the own vehicle detection sensor 2 and the environmental situation acquisition section 3, and receives and stores own vehicle information, other vehicle information, and the like acquired by the own vehicle detection sensor 2 and the environmental situation acquisition section 3.

The ECU 4 functions as a normal traveling control unit which instructs a vehicle to travel in accordance with a normal traveling rule on the basis of the situation of the own vehicle and the environmental situation around the own vehicle. The ECU 4 also functions as a traveling propriety determination unit which determines whether the vehicle traveling in accordance with the normal traveling rule is proper traveling or not on the basis of environmental information around the vehicle. The ECU 4 also functions as an emergency evacuation traveling control unit which, when it is determined that the vehicle traveling in accordance with the normal traveling rule is not proper traveling, instructs the vehicle to perform emergency evacuation traveling which is not in accordance with the normal traveling rule. The normal traveling rule corresponds to, for example, a normal traffic rule, and traffic rules and regulations are set as defined by the road traffic laws. As the normal traveling rule, rules regarding vehicle traveling other than the traffic rules may be set. In this embodiment, description will be made for a case where the normal traffic rules are used as the normal traveling rule.

The ECU 4 includes a map database 41, an own vehicle route generation section 42, a route danger degree evaluation section 43, a rule observance control section 44, a rule priority storage section 45, and a tolerable danger degree storage section 46.

The map database 41 is a database for storing map information of a road as a course for vehicle traveling. The own vehicle route generation section 42 generates a route of the own vehicle on the basis of position information of the vehicle, map information, and the like. For example, own vehicle route generation section 42 reads a travelable area around the current position of the own vehicle on the basis of position information of the own vehicle and map information around the own vehicle, generates an operation sequence of the own vehicle for a predetermined time (for example, several seconds) after, and acquires one route candidate. This route candidate acquisition processing is repeated a predetermined number of times to generate a plurality of route candidates, and the plurality of route candidates are output as a route candidate signal.

The route danger degree evaluation section 43 evaluates the degree of danger in the route of the own vehicle. For example, the route danger degree evaluation section 43 receives environmental information around the own vehicle, calculates a peripheral mobile object route distribution of other mobile objects, such as other vehicles and the like, around the own vehicle from the current time to a predetermined time after on the basis of the environmental information, extracts one route candidate from the route candidate signal, and calculates the degree of danger of a route candidate from the route candidate and the peripheral mobile object route distribution. For all the route candidates, the degree of danger is calculated, and a route candidate group signal with danger degree evaluation obtained by appending the degrees of danger to the respective route is output.

The rule observance control section 44 decides a route such that the vehicle observes the set traffic rules. For example, the rule observance control section 44 receives the route candidate group signal with danger degree evaluation output from the route danger degree evaluation section 43, and turns on determination flags of all traffic rules of a traffic rule table. As shown in FIG. 2, the traffic rule table is a table in which priority is placed on a plurality of traffic rules, and includes a determination flag for determining rule observance. The determination flag is turned on for rules that should be observed, and turned off for rules that are not observed. As the traffic rules include, for example, observance of signal indication, observance of slow at place with blocked view, observance of stop, observance of do not enter, observance of stop with space on roadside, observance of no stray, observance of minimum speed, and observance of speed limit are set.

The rule observance control section 44 extracts respective route candidate information from the route candidate group signal, and determines whether or not the traffic rule table with the determination flag turned on is observed. Then, processing is performed for all the route candidates for putting the relevant route candidate in an output route candidate buffer when all the traffic rules with the determination flag turned on are observed, or for discarding the relevant route candidate when all the traffic rules are not observed.

Presence/absence of route candidates in the output route candidate buffer is confirmed, and when there are route candidates in the output route candidate buffer, the degree of danger in a route candidate with the minimum degree of danger from among the route candidates is compared with the tolerable degree of danger stored in the tolerable danger degree storage section 46. When the degree of danger in the route candidate with the minimum degree of danger is smaller than the tolerable degree of danger, the route candidate with the minimum degree of danger is set as a traveling route of the vehicle, and a control signal is output to the traveling output section 5 such that the vehicle travels along the route. When the degree of danger in the route with the minimum degree of danger is not smaller than the tolerable degree of danger, and when there is no route candidate in the output route candidate buffer, the priority of the traffic rule is read from the rule priority recording section 45. Then, when there is no traffic rule with the determination flag turned on, the route candidate with the minimum degree of danger is set as a traveling candidate of the vehicle, and a control signal is output to the traveling output section 5 such that the vehicle travels along the route. When there are traffic rules with the determination flag turned on, the determination flag of a traffic rule with lowest priority from among the traffic rules with the determination flag turned on is turned off, and processing is repeatedly performed again for the route candidates for determining whether or not the traffic rule table with the determination flag turned on is observed.

The own vehicle route generation section 42, the route danger degree evaluation section 43, and the rule observance control section 44 provided in the ECU 4 may be implemented by installing a program on a computer or may be implemented by individual hardware.

As shown in FIG. 1, a traveling output section 5 is connected to the ECU 4. The traveling output section 5 performs driving/traveling of the vehicle, for example, traveling drive, braking, and steering operations in response to the control signal of the ECU 4. The traveling output section 5 corresponds to, for example, traveling drive ECU, braking ECU, steering ECU, and the like.

Next, an operation of the vehicle traveling controller 1 of this embodiment will be described.

Figure 3:
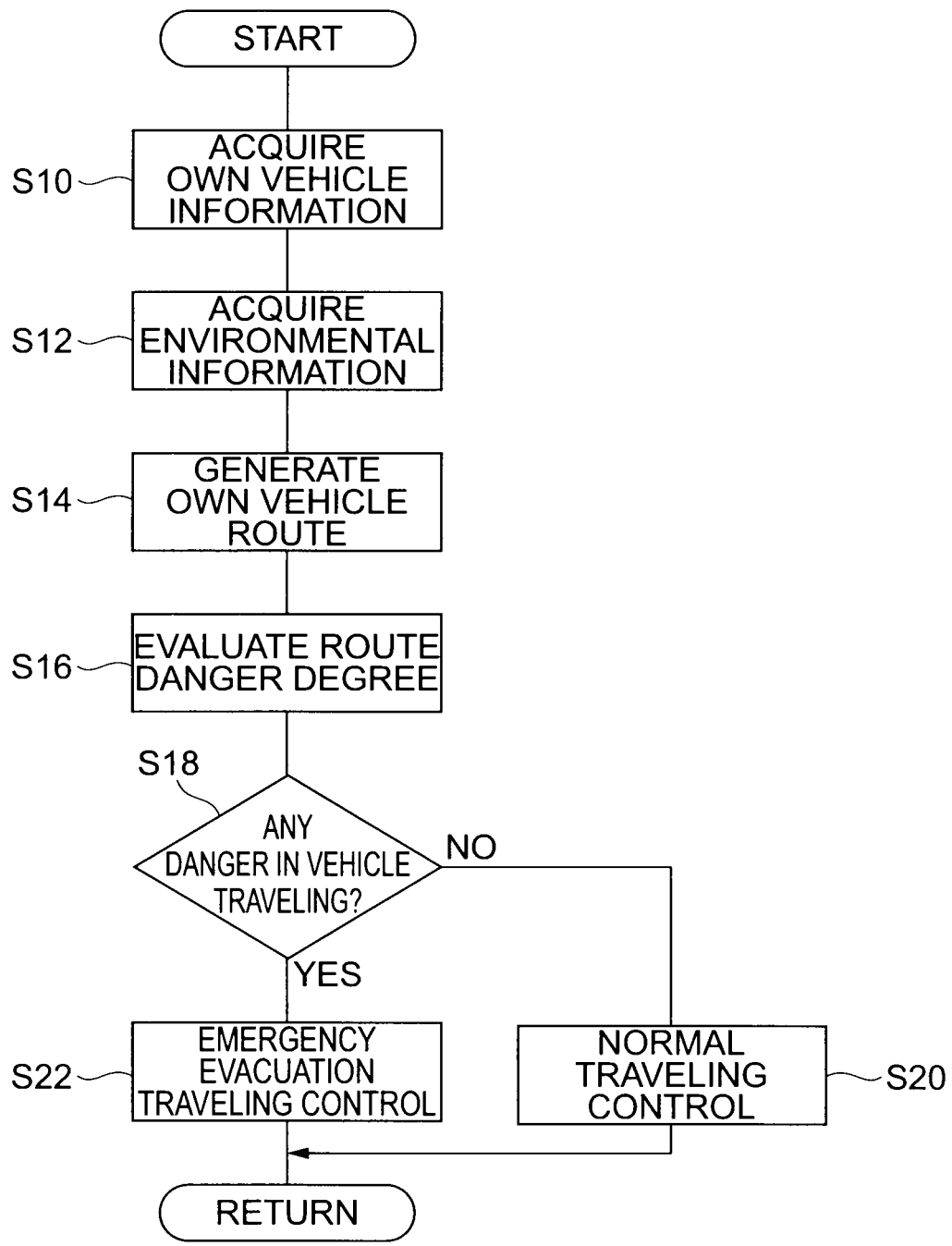
FIG. 3 is a flowchart showing an operation in the vehicle traveling controller of FIG. 1.

FIG. 3 is a flowchart showing an operation of the vehicle traveling controller 1 of this embodiment. For example, control processing of FIG. 3 is repeatedly executed by the ECU 4 in a predetermined cycle.

With regard to the operation of the vehicle traveling controller 1, first, as shown in S10 of FIG. 3, own vehicle information acquisition processing is performed. The own vehicle information acquisition processing is processing for acquiring position information and vehicle speed information of the own vehicle, and is performed, for example, on the basis of an output signal of the own vehicle detection sensor 2. With this own vehicle information acquisition processing, the current position, vehicle speed, and traveling direction of the own vehicle can be specified.

The process progresses to S12, and environmental information acquisition processing is performed. The environmental information acquisition processing is processing for acquiring environmental information around the own vehicle, and is performed, for example, on the basis of an output signal of the environmental situation acquisition section 3. With this environmental information acquisition processing, the positions, movement speed, movement directions, and the like of other vehicles, other mobile objects, and stationary objects can be specified.

The process progresses to S14, and own vehicle route generation processing is performed. The own vehicle route generation processing is processing for generating a route of the own vehicle on the basis of position information of the vehicle, map information, and the like. For example, a travelable area around the current position of the own vehicle is read on the basis of the position information of the own vehicle and the map information around the own vehicle, and a route candidate of the own vehicle to a predetermined time after is generated.

The process progresses to S16, and route danger degree evaluation processing is performed. The route danger degree evaluation processing is processing for evaluating the degree of danger in vehicle traveling of a route candidate generated in S14. For example, a peripheral mobile object route distribution of mobile objects, such as other vehicles or the like around the own vehicle, from the current time to a predetermined time after is calculated on the basis of the environmental information around the own vehicle, and the degree of danger of a route candidate is calculated from the route candidate of the own vehicle and the peripheral mobile object route distribution. In this case, it is preferable that stationary objects, such as an obstacle and the like, as well as mobile objects around the own vehicle are taken into consideration. By calculating the degree of danger of the route candidate from the position of the stationary objects and the route candidate of the own vehicle, dangerousness of collision with the obstacle on the route can be also evaluated.

The process progresses to S18, and it is determined whether or not the degree of danger in vehicle traveling is equal to or smaller than a predetermined value. For example, it is determined whether the vehicle traveling in accordance with the normal traffic rule is proper traveling or not on the basis of the environmental situation, such as the traveling states of other vehicles around the own vehicle, presence/absence of an obstacle on the route, and the like. In this case, when a plurality of normal traffic rules are set, it may be determined whether the vehicle traveling in accordance with all of the plurality of normal traffic rules is proper traveling.

When it is determined in S18 that the vehicle traveling in accordance with the normal traffic rule is proper traveling, normal traveling control processing is performed (S20). The normal traveling control processing is processing for instructing the vehicle to perform vehicle traveling in accordance with the normal traffic rule, and is performed in response to a control signal for instructing the vehicle to perform vehicle traveling in accordance with the normal traffic rule output from the ECU 4 to the traveling output section 5.

When it is determined in S18 that the vehicle traveling in accordance with the normal traffic rule is not proper traveling, emergency evacuation traveling control processing is performed (S22). The emergency evacuation traveling control processing is processing for instructing the vehicle to perform emergency evacuation traveling which is not in accordance with the normal traffic rule, and is performed in response to a control signal for instructing the vehicle to perform emergency evacuation traveling, which is not in accordance with the normal traffic rule, output from the ECU 4 to the traveling output section 5. For example, when a plurality of normal traffic rules are set, if vehicle traveling in accordance with all of the plurality of normal traffic rules is not proper traveling, the emergency evacuation traveling control processing is executed. In this case, it is preferable to instruct the vehicle to perform emergency evacuation traveling which is not in accordance with traffic rules with low priority from among the plurality of traffic rules. That is, it is possible to prevent emergency evacuation traveling which is not in accordance with all of the normal traffic rules from being performed, so the vehicle can perform safe vehicle traveling while observing a traveling rule with high priority.

Figure 4:
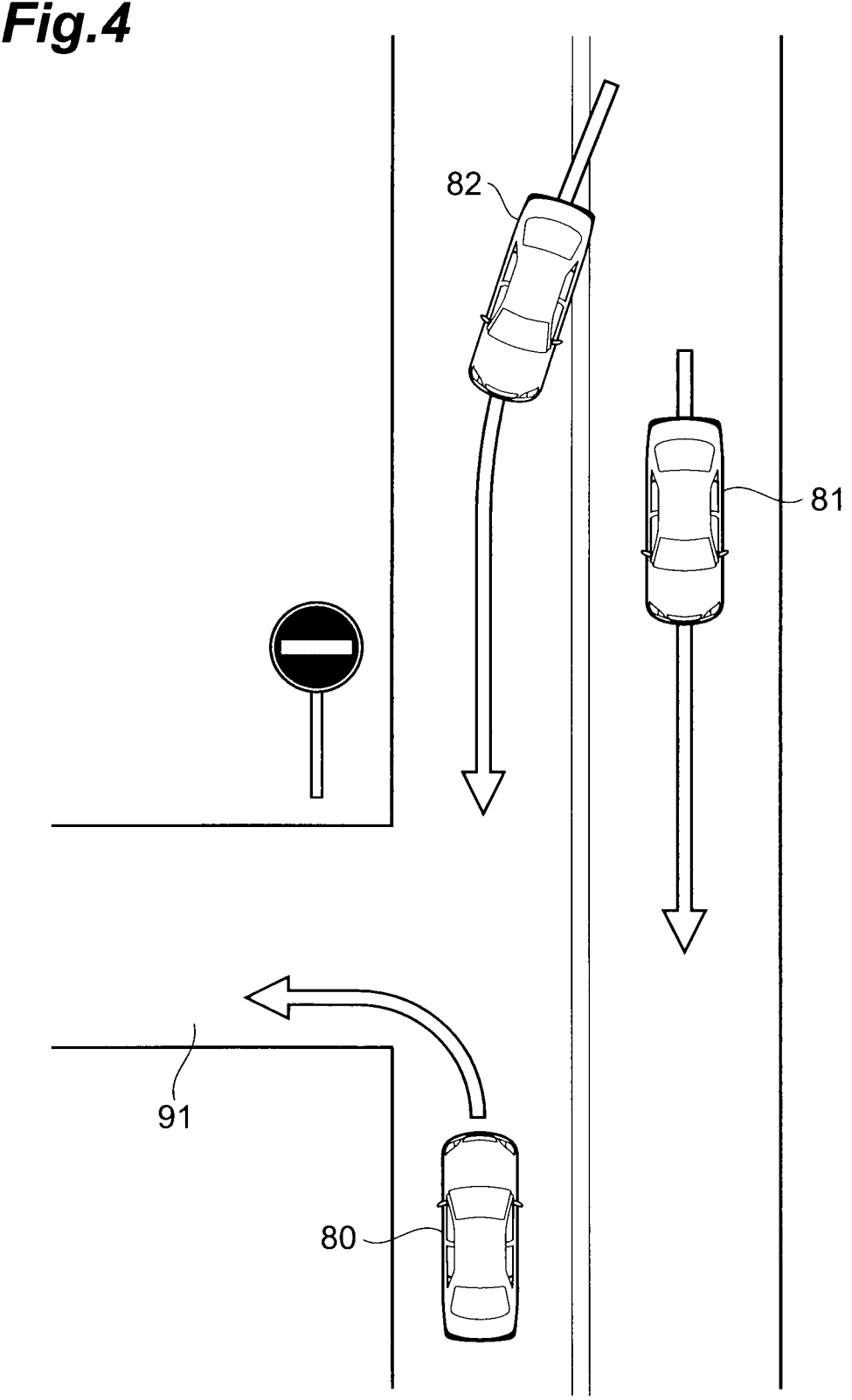
FIG. 4 is an explanatory view of emergency evacuation traveling control processing in the vehicle traveling controller of FIG. 1.

The emergency evacuation traveling control processing will be described specifically. For example, as shown in FIG. 4, when an own vehicle 80 is traveling on a road with opposing two lanes, if a vehicle 82 coming from the opposite direction is traveling on the own lane so as to pass a preceding vehicle 81 coming from the opposite direction, it is hard for the own vehicle 80 to perform safe vehicle traveling in accordance with the normal traffic rule since the vehicles 81 and 82 coming from the opposite direction are traveling side by side. Even though the vehicle 80 stops traveling, it is difficult to avoid danger. In this case, the vehicle traveling controller 1 executes emergency evacuation traveling which is not in accordance with the normal traffic rule: observance of do not enter. That is, the own vehicle 80 is instructed to travel a side road 91 that a vehicle is prohibited from entering. Thus, collision with the vehicle 82 coming from the opposite direction can be avoided, and the safety of vehicle traveling in the case of an emergency can be increased. When emergency evacuation traveling which is not in accordance with the normal traffic rule is performed, it is preferable to confirm whether or not there is dangerousness when the emergency evacuation traveling is performed. For example, it is preferable that, after it is confirmed that no vehicle is on the side road 91, the own vehicle 80 is instructed to travel the side road 91. Therefore, the safety of vehicle traveling in the case of an emergency can be further increased.

Figure 5:
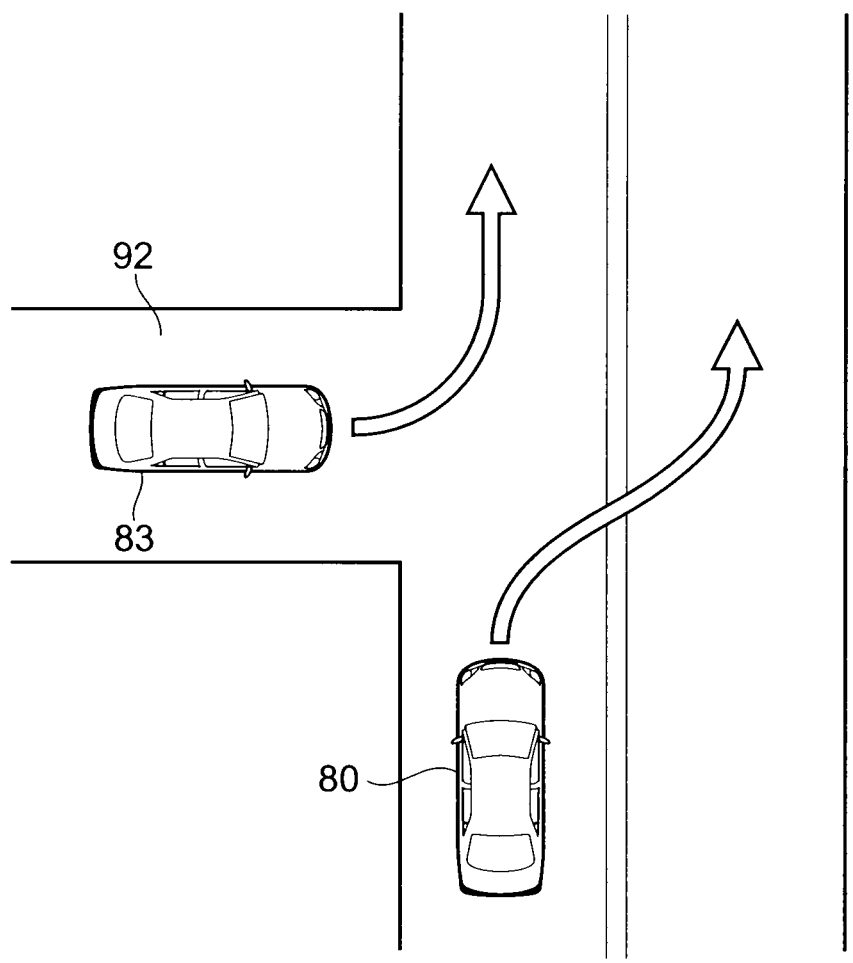
FIG. 5 is an explanatory view of emergency evacuation traveling control processing in the vehicle traveling controller of FIG. 1.

As shown in FIG. 5, when the own vehicle 80 is traveling on the road with opposing two lanes, a vehicle 83 rushes out from the side road 92, the own vehicle 80 inevitably collides with the vehicle 83 when still traveling on the own lane. Even though the vehicle 80 is braking with full braking, it is difficult to avoid danger. In this case, the vehicle traveling controller 1 executes emergency evacuation traveling which is not in accordance with the normal traffic rule: observance of no passing. That is, the own vehicle 80 is instructed to pass via the opposing lane. Thus, contact with and collision with the vehicle 83 can be avoided, and the safety of vehicle traveling in the case of an emergency can be increased. When emergency evacuation traveling which is not in accordance with the normal traffic rule is performed, it is preferable to confirm whether or not there is dangerousness when the emergency evacuation traveling is performed. For example, it is preferable that, after it is confirmed that there is no vehicle coming from the opposite direction on the opposing lane, the own vehicle 80 is instructed to pass via the opposing lane. Therefore, the safety of vehicle traveling in the case of an emergency can be further increased.

Figure 6:
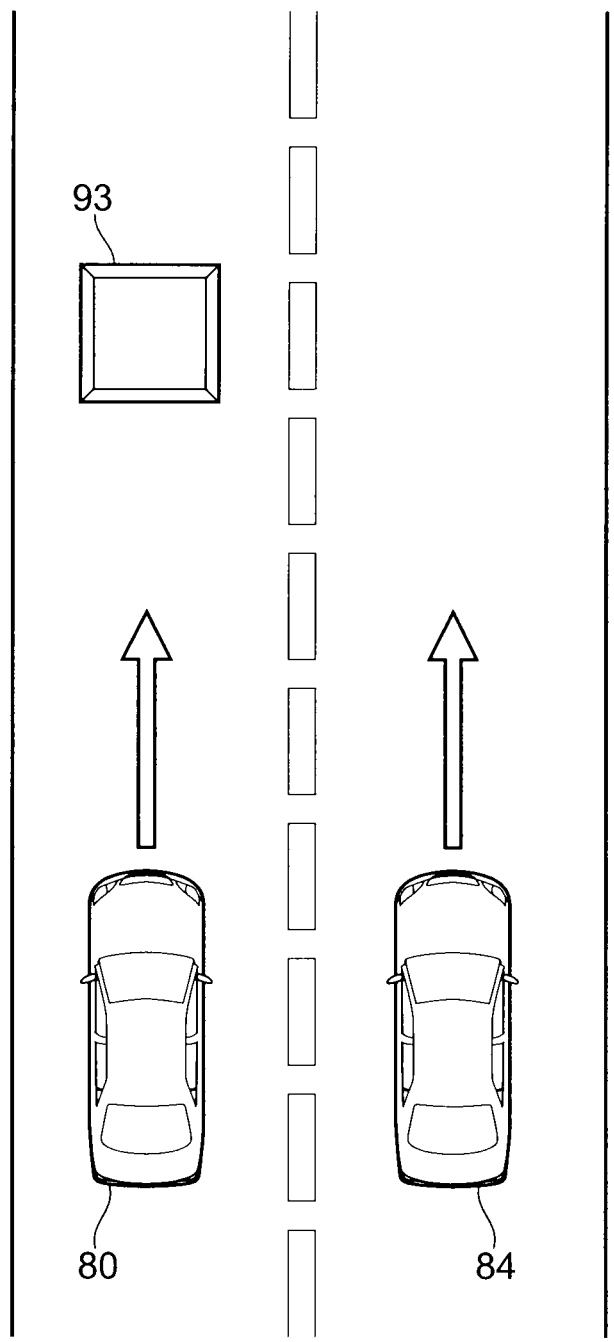
FIG. 6 is an explanatory view of emergency evacuation traveling control processing in the vehicle traveling controller of FIG. 1.

As shown in FIG. 6, when the own vehicle 80 is traveling on a highway, if a fallen object 93 is in front of the own vehicle 80, and a vehicle 84 is traveling in parallel to the own vehicle 80, the own vehicle 80 cannot change a lane, so it is hard for the own vehicle 80 to avoid collision with the fallen object 93. Further, there is a minimum speed limit, so in the case of traveling in accordance with the normal traffic rule, the vehicle 80 cannot stop traveling and it is difficult to avoid danger by stopping. In this case, the vehicle traveling controller 1 executes emergency evacuation traveling which is not in accordance with the normal traffic rule: observance of minimum speed. That is, the own vehicle 80 is instructed to reduce the speed so as not to collide with the fallen object 93 or the own vehicle 80 is instructed to stop traveling. Therefore, collision with the fallen object 93 can be avoided, and the safety of vehicle traveling in the case of an emergency can be increased. When emergency evacuation traveling which is not in accordance with the normal traffic rule is performed, it is preferable to confirm whether or not there is dangerousness when the emergency evacuation traveling is performed. For example, it is preferable that, after it is confirmed that there is no succeeding vehicle or there is a sufficient distance from the succeeding vehicle, the own vehicle 80 is instructed to reduce the speed or to stop. Therefore, the safety of vehicle traveling in the case of an emergency can be further increased.

Figure 7:
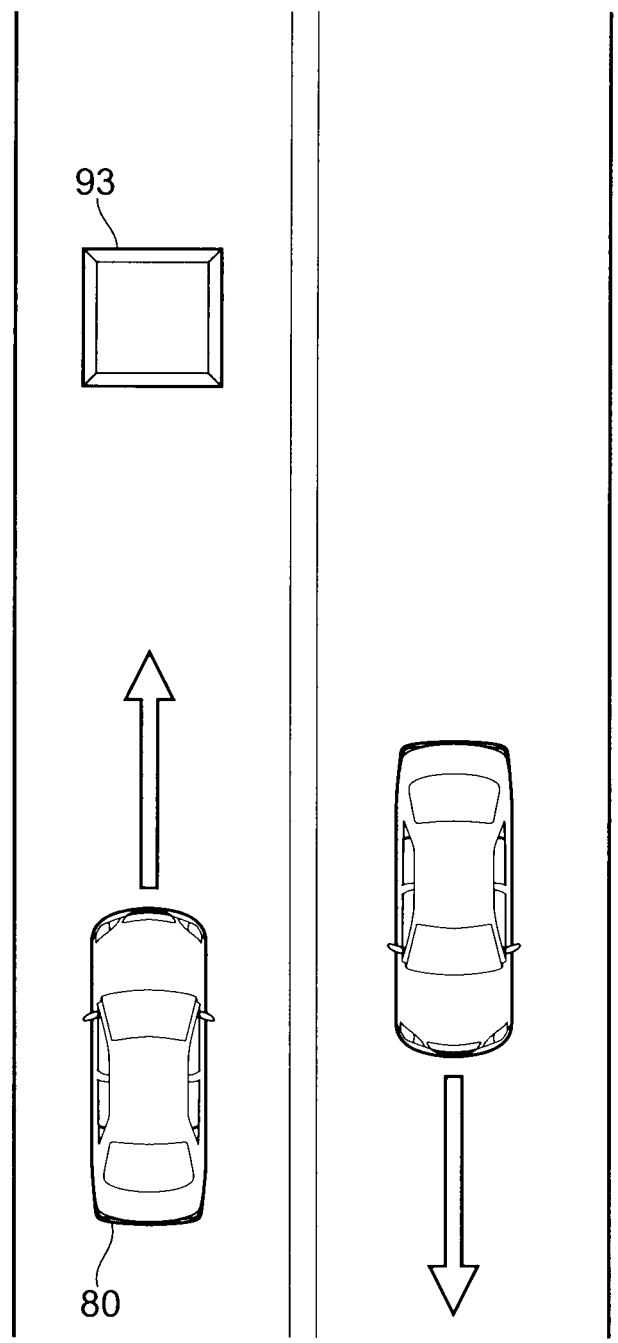
FIG. 7 is an explanatory view of emergency evacuation traveling control processing in the vehicle traveling controller of FIG. 1.

As shown in FIG. 7, when the own vehicle 80 is traveling on the road with opposing two lanes, if a fallen object 93 is in front of the own vehicle 80, the own vehicle 80 cannot change a lane, so it is hard for the own vehicle 80 to avoid collision with the fallen object 93. In this case, the vehicle traveling controller 1 executes emergency evacuation traveling which is not in accordance with the normal traffic rule: observance of minimum speed. That is, the vehicle 80 is instructed to pass via the opposing lane. Thus, collision with the fallen object 93 can be avoided, and the safety of vehicle traveling in the case of an emergency can be increased. When emergency evacuation traveling which is not in accordance with the normal traffic rule is performed, it is preferable to confirm whether or not there is dangerousness when the emergency evacuation traveling is performed. For example, it is preferable that, after it is confirmed that there is no vehicle coming from the opposite direction on the opposing lane, the own vehicle 80 is instructed to pass via the opposing lane. Therefore, the safety of vehicle traveling in the case of an emergency can be further increased.

The emergency evacuation traveling is performed for the purpose of emergency evacuation in the case of vehicle traveling which is not in accordance with the normal traffic rules individually defined, specifically, is performed for the purposes of preventing danger in vehicle traveling, improving traffic safety, and preventing disturbance due to the road traffic under the road traffic law. After the processing of S20 or S22 of FIG. 1 ends, a sequence of control processing ends.

As described above, according to the vehicle traveling controller 1 of this embodiment, when vehicle traveling in accordance with the normal traffic rule is not proper traveling, the vehicle is instructed to perform emergency evacuation traveling which is not in accordance with the normal traffic rule, emergency evacuation traveling with high safety can be performed, as compared with vehicle traveling in accordance with the normal traveling rule. Therefore, the safety of vehicle traveling can be improved.

According to the vehicle traveling controller 1 of this embodiment, when it is determined that the vehicle traveling in accordance with all of a plurality of traffic rules is not proper traveling, emergency evacuation traveling which is not in accordance with traffic rules with low priority from among the plurality of normal traffic rules is performed, so the vehicle can perform safe vehicle traveling while observing a traffic rule with high priority.

In this embodiment, an example of the vehicle traveling controller according to the invention has been described. Thus, the vehicle traveling controller according to the invention is not limited to the example but may be modified or applied to others so as not to change the gist of the invention described in the appended claims.

Although in this embodiment, a case where a normal traffic rule is set as the normal traveling rule, a rule of a vehicle traveling state may be used as the normal traveling rule. Further, a rule for limiting abrupt acceleration equal to or more than a set value or a rule for limiting abrupt steering equal to or more than a set value may be used as the normal traveling rule.

INDUSTRIAL APPLICABILITY

According to the invention, emergency evacuation traveling is performed in the case of an emergency, so traveling control with high safety is performed.

The invention claimed is:

1. A vehicle traveling controller comprising:
an electronic control unit, including a memory, configured to:
store a plurality of traffic rules defined by traffic laws;
instruct a vehicle to travel in accordance with at least one stored traffic rule;
determine whether or not the vehicle traveling in accordance with the at least one stored traffic rule is proper traveling on the basis of environmental information around the vehicle;
select a proper emergency evacuation route in accordance with the environmental information around the vehicle and instruct the vehicle to perform emergency evacuation traveling that is not in accordance with the at least one stored traffic rule when it is determined that the vehicle traveling in accordance with the at least one stored traffic rule is not proper traveling; and
not select the proper emergency evacuation route and instruct the vehicle not to perform the emergency evacuation traveling when it is determined that the vehicle traveling in accordance with the at least one stored traffic rule is proper traveling.

2. The vehicle traveling controller according to claim 1, wherein the electronic control unit is further configured to:
determine whether or not the vehicle traveling in accordance with the at least one stored traffic rule exceeds a degree of danger set in advance on the basis of the environmental information, and
determine that the vehicle traveling in accordance with the at least one stored traffic rule is not proper traveling and instruct the vehicle to perform the emergency evacuation traveling that is not in accordance with the at least one stored traffic rule when it is determined that the vehicle traveling in accordance with the at least one stored traffic rule exceeds the degree of danger set in advance.

3. The vehicle traveling controller according to claim 1, wherein the electronic control unit is further configured to:
instruct the vehicle to travel in accordance with the plurality of stored traffic rules,
determine whether or not the vehicle traveling in accordance with all of the plurality of stored traffic rules is proper traveling on the basis of the environmental information around the vehicle, and
instruct the vehicle to perform the emergency evacuation traveling that is not in accordance with the plurality of stored traffic rules on the basis of a priority set for each of the plurality of stored traffic rules when it is determined that the vehicle traveling in accordance with all of the plurality of stored traffic rules is not proper traveling.

4. The vehicle traveling controller according to claim 2, wherein the electronic control unit is further configured to:
instruct the vehicle to travel in accordance with the plurality of stored traffic rules,
determine whether or not the vehicle traveling in accordance with all of the plurality of stored traffic rules is proper traveling on the basis of the environmental information around the vehicle, and
instruct the vehicle to perform the emergency evacuation traveling that is not in accordance with the plurality of stored traffic rules on the basis of a priority set for each of the plurality of stored traffic rules when it is determined that the vehicle traveling in accordance with all of the plurality of stored traffic rules is not proper traveling.

5. A vehicle traveling controller comprising:
an electronic control unit, including a memory, configured to:
store a plurality of traffic rules defined by traffic laws;
instruct a vehicle to travel in accordance with at least one stored traffic rule;
determine whether or not the vehicle traveling in accordance with the at least one stored traffic rule is proper traveling on the basis of environmental information around the vehicle;
change a traveling rule to be observed at a place where the vehicle is currently traveling and instruct the vehicle to perform emergency evacuation traveling that is not in accordance with the at least one stored traffic rule when it is determined that the vehicle traveling in accordance with the at least one stored traffic rule is not proper traveling, and
not change the traveling rule to be observed and instruct the vehicle not to perform the emergency evacuation traveling when it is determined that the vehicle traveling in accordance with the at least one stored traffic rule is proper traveling.

6. The vehicle traveling controller according to claim 5, wherein the electronic control unit is further configured to:
determine whether or not the vehicle traveling in accordance with the at least one stored traffic rule exceeds a degree of danger set in advance on the basis of the environmental information, and
determine that the vehicle traveling in accordance with the at least one stored traffic rule is not proper traveling and instruct the vehicle to perform the emergency evacuation traveling that is not in accordance with the at least one stored traffic rule when it is determined that the vehicle traveling in accordance with the at least one stored traffic rule exceeds the degree of danger set in advance.

7. The vehicle traveling controller according to claim 3, wherein the electronic control unit is configured to instruct the vehicle to perform the emergency evacuation traveling that is not in accordance with a first stored traffic rule of the plurality of stored traffic rules having a priority lower than that of another stored traffic rule of the plurality of stored traffic rules.

8. The vehicle traveling controller according to claim 4, wherein the electronic control unit is further configured to instruct the vehicle to perform the emergency evacuation traveling that is not in accordance with a first stored traffic rule of the plurality of stored traffic rules having a priority lower than that of another stored traffic rule of the plurality of stored traffic rules.

9. The vehicle traveling controller according to claim 1, wherein the emergency evacuation traveling is traveling that is not in accordance with a stored traffic rule of observance of do not enter.

10. The vehicle traveling controller according to claim 1, wherein the emergency evacuation traveling is traveling that is not in according with a stored traffic rule of observance of no passing.

11. The vehicle traveling controller according to claim 1, wherein the emergency evacuation traveling is traveling that is not in accordance with a stored traffic rule of observance of minimum speed.

12. The vehicle travelling controller according to claim 1, wherein the emergency evacuation traveling is traveling that is not in accordance with a stored traffic rule of observance of a signal indication, observance of slow at a place with a blocked view, observance of stop, observance of do not enter, observance of stop with a space on a roadside, observance of no stray, observance of a minimum speed, or observance of a speed limit.

13. A vehicle traveling controller comprising:
- an electronic control unit, including a memory, configured to:
  - store a plurality of traffic rules defined by traffic laws;
  - instruct a vehicle to travel in accordance with at least one stored traffic rule;
  - determine whether or not the vehicle traveling in accordance with the at least one stored traffic rule is proper traveling on the basis of environmental information around the vehicle;
  - select a proper emergency evacuation route in accordance with the environmental information around the vehicle and instruct the vehicle to perform emergency evacuation traveling that is not in accordance with the at least one stored traffic rule when it is determined that the vehicle traveling in accordance with the at least one stored traffic rule is not proper traveling; and
  - not select the proper emergency evacuation route, and instruct the vehicle not to perform the emergency evacuation traveling when it is determined that the vehicle traveling in accordance with the at least one stored traffic rule is proper traveling,
- wherein emergency evacuation traveling is traveling that is not in accordance with a stored traffic rule of observance of a signal indication, observance of slow at a place with a blocked view, observance of stop, observance of do not enter, observance of stop with a space on a roadside, observance of no stray, observance of a minimum speed, or observance of a speed limit.

* * * * *